United States Patent [19]

Loveless

[11] 4,187,884
[45] Feb. 12, 1980

[54] FOUR-WAY VALVE EMPLOYING FLUID SPRING

[75] Inventor: Stanley M. Loveless, Oshtemo Township, Kalamazoo County, Mich.

[73] Assignee: General Gas Light Company, Kalamazoo, Mich.

[21] Appl. No.: 914,795

[22] Filed: Jun. 12, 1978

[51] Int. Cl.² .............................................. F15B 13/042
[52] U.S. Cl. .......................... 137/625.69; 137/625.66; 137/DIG. 7; 251/DIG. 1
[58] Field of Search ...................... 137/625.66, 625.69, 137/DIG. 7; 251/DIG. 1

[56] References Cited

U.S. PATENT DOCUMENTS

| 3,819,152 | 6/1974 | Clippard | 251/DIG. 1 X |
| 3,949,645 | 4/1976 | Maslet | 137/625.66 X |
| 4,026,325 | 5/1977 | Loveless | 137/625.69 X |

Primary Examiner—Gerald A. Michalsky
Attorney, Agent, or Firm—Blanchard, Flynn, Thiel, Boutell & Tanis

[57] ABSTRACT

A valve assembly including a housing having an elongated bore formed therein. Inlet, outlet, and load ports communicate with the bore. A valve is positioned within the bore for controlling flow of a pressure fluid between the ports. A seal ring is mounted on the valve and disposed in sealing engagement with the housing in the vicinity of the inlet port. The seal ring is axially shiftable across the inlet port in response to shifting movement of the valve. The seal ring is mounted in an annular groove which encircles the valve and has an axial width substantially greater than the axial width of the seal ring. The seal ring is shifted axially relative to the groove by the pressure fluid supplied through the inlet port when the valve is shifted between first and second operational positions. A fluid-assisted spring means coacts between the valve and the housing, which spring means includes a spring-confining chamber defined between one end of the valve and the adjacent portion of the housing. A passage extends interiorly of the valve for providing fluid communication between the chamber and the inlet port. The passage terminates in a hole which opens through the bottom of the groove. The seal ring is movable over the hole during shifting of the valve between the first and second operational positions.

6 Claims, 2 Drawing Figures

FOUR-WAY VALVE EMPLOYING FLUID SPRING

FIELD OF THE INVENTION

This invention relates to a spool-type valve assembly for controlling the flow of a pressurized gas, usually air, and particularly a four-way valve assembly having a fluid or fluid-assisted spring means for returning the valve to its normal position.

BACKGROUND OF THE INVENTION

Valve assemblies of the type employing a shiftable spool valve commonly employ a mechanical spring for returning the valve spool to its normal end position. However, as the pressure of the fluid controlled by the valve increases, the valve seals are increasingly deformed, so that a larger return force is required for returning the valve to its normal position. For this reason, such valve assemblies conventionally use a fluid-assisted spring for returning the valve spool to its normal position, whereby the mechanical spring force is only strong enough to return the spool at zero or very low fluid pressure, whereas the air spring provides additional return force as the fluid pressure increases. These valve assemblies are normally provided with an actuator associated with one end of the valve spool for causing axial displacement thereof from one end position into an opposite end position. This actuator often comprises a fluid pilot but may be of many different types, such as manual, mechanical or electrical. The fluid-assisted spring is normally associated with the end of the valve spool opposite the actuator, and conventionally comprises a closed chamber defined between the valve spool and the housing for confining therein a mechanical spring. This chamber is normally in continuous communication with the inlet port, and for this purpose a passageway is normally provided either internally or externally of the housing. This makes manufacture of the housing more complex or, in the alternative, makes the overall housing bulky and cumbersome. This also results in the housing for a valve assembly employing a fluid-assisted spring being different from the housing for a valve assembly which does not employ a fluid spring, thereby preventing standardization of the housings.

It is thus an object of the present invention to provide an improved valve assembly capable of being provided with a fluid-assisted spring, which valve assembly overcomes the above-mentioned disadvantages.

More specifically, it is an object of this invention to provide an improved fluid-assisted spring means for use with a shiftable spool-type valve assembly, which spring means utilizes a communication passage extending interiorly of the valve spool for providing communication between the inlet port and the spring chamber, whereby the valve housing can be simplified and standardized.

Another object is to provide an improved valve assembly, as aforesaid, which utilizes an O-ring positioned within an annular groove on the valve spool, which annular groove is of substantially greater axial width than the diameter of the O-ring so that when the latter is shifted axially across the inlet port during shifting of the spool, the O-ring is axially shifted relative to the spool, whereby the O-ring displacement is greater than the valve spool displacement so that minimum shifting of the valve spool is possible.

A further object is to provide an improved valve assembly, as aforesaid, wherein the communication passage between the inlet port and the spring chamber extends axially from the spring chamber through the valve spool and terminates at the bottom of said groove, whereby the O-ring is rapidly shifted axially across the open end of the communication passage so that the latter provides substantially continuous communication between the inlet port and the spring chamber.

Other objects and purposes of the invention will be apparent to persons familiar with valve assemblies of this general type upon reading the following specification and inspecting the accompanying drawings.

Figures 1, 2:
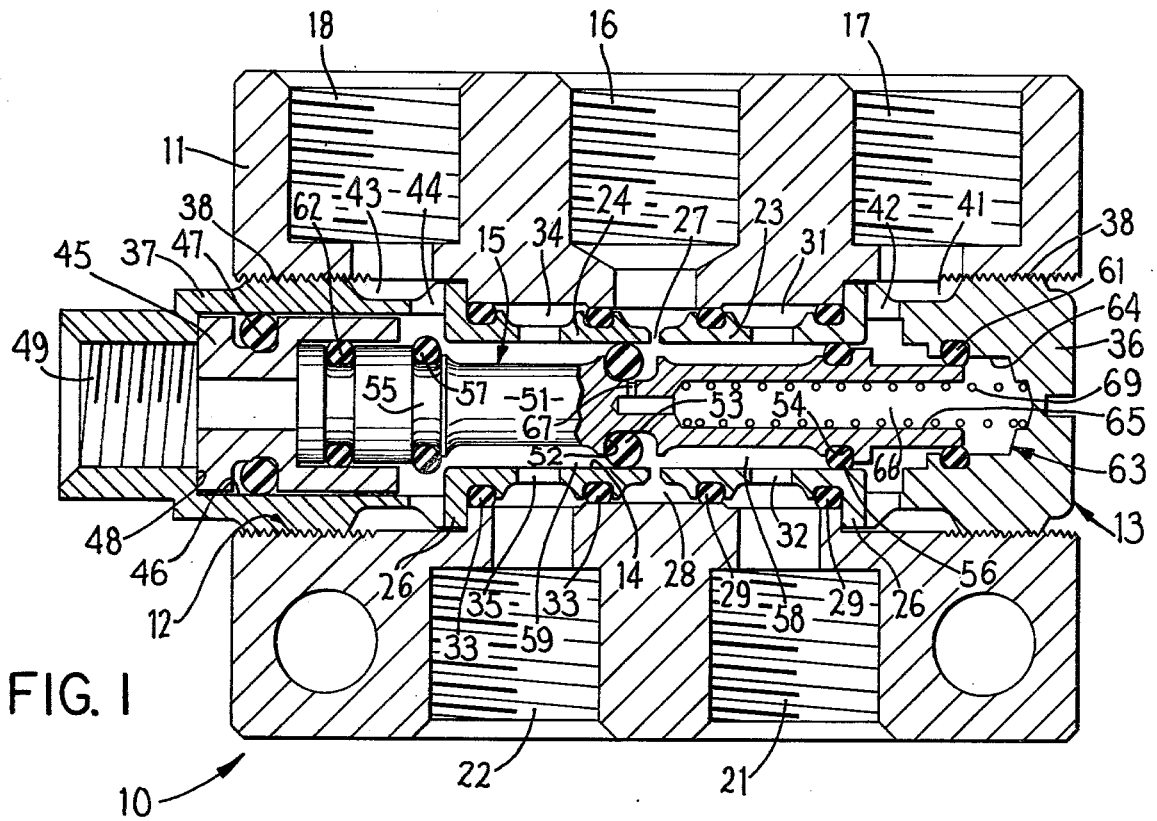
FIG. 1 is a central sectional view of the valve assembly and showing the spool valve in its normal operational position.
FIG. 2 is a sectional similar to FIG. 1 but showing the spool valve in its opposite operational position.

Certain terminology will be used in the following description for convenience in reference only and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the valve assembly and designated parts thereof. Said terminology will include the words specifically mentioned, derivatives thereof and words of similar import.

SUMMARY OF THE INVENTION

A valve assembly including a housing means having an elongated bore formed therein. Inlet, outlet, and load ports are formed in the housing and communicate with the bore. A valve is positioned within the bore means and disposed in sealed slidable engagement with the housing for controlling flow of a pressure fluid between the ports. A seal ring is mounted on the valve and disposed in sealing engagement with the housing in the vicinity of the inlet port. The seal ring is axially shiftable across the inlet port in response to shifting movement of the valve. The seal ring is mounted in an annular groove which encircles the valve and has an axial width substantially greater then the axial width of the seal ring, whereby the seal ring can be shifted axially along the groove. The seal ring is shifted axially relative to the groove by the pressure fluid supplied through the inlet port when the valve is shifted between normal and actuated operational positions. A fluid-assisted spring means coacts between the valve and the housing for urging the valve toward its normal position. The spring means includes a spring chamber defined between one end of the valve and the adjacent portion of the housing which chamber confines therein a mechanical spring. A passage extends interiorly of the valve for providing fluid communication between the chamber and the inlet port. The passage terminates in a hole which opens through the bottom of the groove. The seal ring is movable over the hole during shifting of the valve between its operational positions, and the seal ring is maintained at one end of the groove so that the hole is uncovered and communicates with the inlet port when the valve is in either of said operational positions.

DETAILED DESCRIPTION

The valve assembly 10, as illustrated in FIGS. 1 and 2, includes a valve housing 11 having a bore 12 extending axially therethrough. A sleeve-like liner structure 13 is fixedly positioned within the housing bore, thereby effectively comprising a part of the housing, which liner structure itself defines a valve bore 14 in which a spool valve 15 is axially slidably disposed.

Housing 11 has a plurality of ports therein, namely five ports in the illustrated embodiment. A supply or inlet port 16 projects radially of the housing for communication with the valve bore, which inlet port 16 is adapted for connection in a conventional manner with a supply of pressure fluid, such as pressurized air. A pair of exhaust or outlet ports 17 and 18 are disposed on opposite sides of the inlet port and also project radially of the housing for communication with the valve bore adjacent the opposite axial ends thereof. The housing also has a pair of load ports 21 and 22 formed therein, which load ports communicate with the valve bore on opposite sides of the supply port 16.

The sleeve-like liner structure 13 includes a pair of identical liner segments 23 and 24 which are fixedly disposed in axially opposed relationship within the reduced-diameter center portion of the housing bore 12. These liner segments have annular flanges 26 at their outer ends, which flanges seat against appropriate housing shoulders for retaining the liner segments 23 and 24 in a preselected spaced relationship to result in a narrow annular gap 27 being defined therebetween. This annular gap 27 provides communication between the valve bore 14 and an annular compartment 28 which is defined in surrounding relationship to the liner segments, which compartment 28 is in continuous communication with the supply port 16.

The liner segment 23 is fixedly and sealingly supported within the housing bore by a pair of axially spaced O-rings 29. An annular compartment 31 is defined between the O-rings 29 in surrounding relationship to the liner segment 23, which compartment 29 is in continuous communication with the load port 21 and is also in communication with the valve bore by means of one or more small openings 32 which extend radially through the liner segment 23.

The liner segment 24 is supported in a manner similar to the segment 23, in that it is stationarily and sealingly supported within the housing bore by a pair of spaced O-rings 33. An annular compartment 34, which is in continuous communication with the other load port 22, is defined between the O-rings 33 in surrounding relationship to the liner segment 24. This compartment 34 is also in continuous communication with the valve bore 14 through one or more small holes or ports 35 which extend radially through the liner segment.

Liner structure 13, in addition to segments 23 and 24 described above, also includes additional liner segments 36 and 37 which are disposed adjacent the opposite ends of the valve housing. These liner segments 36 and 37 are disposed within the enlarged-diameter portions of the housing bore as disposed adjacent the opposite ends of the valve housing. These end liner segments are fixedly and sealingly connected to the valve housing, as by means of threaded connectors 38.

The liner segment 36 has an annular compartment 41 disposed in surrounding relationship therewith and positioned in continuous communication with the exhaust port 17. This compartment 41 in turn communicates with the valve bore 14 through a plurality of radially extending openings 42 formed in the liner segment 36.

The other liner segment 37 similarly has an annular compartment 43 disposed in surrounding relationship therewith and in continuous communication with the other exhaust port 18. A plurality of openings 44 extend radially through the liner segment 37 for providing communication between the valve bore 14 and the annular compartment 43.

In the illustrated embodiment, the liner segment 37 is of a sleeve-like construction and has an actuator piston 45 slidably disposed within the bore 46 thereof. An O-ring 47 coacts between piston 45 and bore 46 to create a sealed relationship therebetween. The actuator piston is normally maintained in the position illustrated in FIG. 1 wherein it abuts against an internal shoulder 48 formed on the liner segment 37. A pilot port 49 is formed in the free end of the liner segment 37, which pilot port is connected in a conventional manner to a source of pressurized pilot fluid for causing actuation, that is, axially shifting of the spool valve 15.

Considering now the spool valve 15, same is formed as an elongated cylindrical rod member 51 which, in the central portion thereof, is provided with a surrounding annular groove 52 in which is confined an elastomeric O-ring 53 disposed in sealing engagement with the valve bore 14. The annular groove 52 has a width, as measured in the axial direction of the valve spool, which is substantially greater than the diameter of the O-ring 53 so that the O-ring can shift axially relative to the valve spool through a substantial distance.

The valve member 51 has a pair of further annular grooves 54 and 55 formed thereon adjacent the opposite ends thereof, which grooves confine therein additional elastomeric O-rings 56 and 57, respectively, which O-rings are also adapted to be disposed in sealing engagement with the valve bore defined within the liner segments 23 and 24. The valve member 51 is of substantially smaller diameter than the surrounding valve bore so as to define therebetween a first annular flow passage 58 as disposed axially between the O-rings 53 and 56, with a further annular flow passage 59 being disposed between the O-rings 53 and 57.

A further elastomeric O-ring 61 is confined within the end liner segment 36 and is disposed in slidable sealed engagement with the periphery of the valve member 51 adjacent one end thereof. Another elastomeric O-ring 62 is mounted on the valve member 51 adjacent the other end thereof, and is disposed in sealed engagement with the actuator piston 45.

As illustrated in FIG. 1, the end liner segment 36 is of a cup-shaped configuration and thereby closes one end of the housing bore 12. A fluid-assisted spring means 63 is defined between the liner segment 36 and the valve spool 15 for normally resiliently urging the valve spool toward its normal operational position as shown in FIG. 1, although this spring means 63 also cushions the movement of the valve spool when it is shifted into its actuated operational position illustrated in FIG. 2.

The fluid-assisted spring means 63 is formed by an internal bore 64 formed within the liner segment 36, which bore receives therein the projecting end of the valve member and is in open communication with an interior bore 65 which projects axially inwardly of the valve member throughout a substantial extent thereof. These bores 64 and 65 cooperate to define a spring chamber or compartment 66 for containing a quantity of pressurized working fluid, usually air. The spring chamber 66 is closed except for its communication with a small hole or port 67 which projects radially of the valve member and communicates with the annular groove 52 substantially in the middle thereof. The groove 52 is of sufficient axial width such that, when the O-ring 53 is disposed at either axial end of the groove, the port 67 is uncovered so as to permit its communication with the supply port 16.

The spring means 63 also includes a conventional mechanical compression spring 69 confined within the spring chamber 66 and coacting between the liner segment 36 and the valve member 51 for normally urging the valve spool 15 leftwardly into its normal operational position of FIG. 1. The mechanical spring 69 is normally strong enough to return the valve spool 15 leftwardly from the FIG. 2 to the normal FIG. 1 position only when the working fluid supplied to inlet port 16 is at a very low pressure, such as a pressure approaching zero.

OPERATION

The operation of the valve assembly 10 will be briefly described to insure a complete understanding thereof.

The valve assembly is normally maintained in its normal operational position illustrated in FIG. 1 due to the leftward urging of the valve spool 15 by the mechanical spring 69. When in this position, the working fluid (such as air) is supplied through port 16 and then through annular passage 27 into the valve bore, and specifically into the annular flow passage 58. The working fluid then flows through liner openings 32 into the load port 21 for supply to a source of use, such as one end of a pneumatic cylinder. The pressure fluid flowing from the inlet port 16 through the annular passage 27 acts against the central O-ring 53 and thereby maintains same against the leftward end of the groove 52. The O-rings 53 and 56 are respectively disposed in sealing engagement with the liner segments 24 and 23 so that the inlet port 16 is thus connected in fluid communication solely with the load port 21. The other load port 22 is in open communication with the exhaust port 18 due to the O-ring 57 being spaced outwardly from, and hence not sealingly engaged with, the liner segment 24.

When in the normal operational condition of FIG. 1 as described above, the pressure fluid flowing through inlet port 16 and hence through annular passage 27 also communicates with the spring chamber 66 through the intermediate radial port 67, which radial port is uncovered due to the pressure fluid maintaining the O-ring 53 against the leftward end of the groove 52. The supplied pressure fluid is thus in continuous communication with the spring chamber 66 so that a quantity of the pressurized working fluid is confined therein.

To actuate the valve into the other operational position illustrated in FIG. 2, a pressurized pilot fluid is supplied through port 49 and acts against the exposed ends of the actuating piston 45 and spool valve 15, whereby they are shifted rightwardly into the position of FIG. 2, the extent of such shifting being limited by the abutment of the skirt on the actuating piston 45 against the flange 26 on the liner segment 24. During this rightward shifting of the spool valve, the O-ring 57 is first moved into sealing engagement with the liner segment 24 to isolate the exhaust port 18 from the load port 22, and to provide proper support and confinement of the O-ring 57 to prevent it from being dislodged from its groove when exposed to the inlet port pressure. Slightly after the engagement of O-ring 57 with the liner 24, the central O-ring 53 is moved across the annular gap 27 so that the supply port 16 is only momentarily isolated or shut off from the valve bore 14. As soon as the O-ring 53 moves sufficiently across the annular gap 27 so as to again partially open same, then the pressurized working fluid from port 16 flowing through the annular gap 27 acts against the leftward side of O-ring 53 and forces the O-ring 53 to rapidly move into a position adjacent the rightward end of the annular groove 52. This thus not only accelerates the uncovering of the annular gap 27, but also results in the O-ring 53 being rapidly moved into sealing engagement with the liner segment 23.

During the rapid shifting of the O-ring 53 from one end of groove 52 to the other end thereof, which rapid shifting is caused by the inflowing pressurized working fluid, the O-ring 53 momentarily passes over and closes off the port 67 associated with the spring chamber 66, although as soon as the O-ring 53 reaches the rightward end of groove 52, the port 67 is again fully open so that the spring chamber is again in continuous communication with the inlet port 16. At this time, the inlet port 16 now communicates through the annular flow passage 59 and through the holes 35 with the other load port 22, which in turn is connected to a suitable load, such as the opposite end of a pneumatic cylinder.

Substantially simultaneous with the rightward movement of O-ring 53 into overlapping engagement with annular gap 27, the O-ring 56 is moved rightwardly out of engagement with the liner segment 23 so that the previously pressurized load port 21 is thus disposed in open communication with the other exhaust port 17 to permit discharge of the working fluid.

The rightward shifting of valve spool 15, as above described, results in the volume of the spring chamber 66 being decreased. This decrease in volume of the spring chamber causes the working fluid therein to be momentarily compressed so as to increase the pressure thereof, due to the restricted rate at which the working fluid can escape from the spring chamber 66 in view of the small diameter of the port 67. This thus cushions the shifting of the valve spool and prevents same from severely impacting against the valve housing upon reaching its extreme rightwardmost position.

The valve spool will remain in the rightwardmost position of FIG. 2 so long as the pilot fluid is supplied to the pilot port 49. When the supply of pressurized pilot fluid to the port 49 is discontinued, then the return force exerted by the spring means 63 automatically moves the valve spool leftwardly into its original normal position as illustrated in FIG. 1. During this return movement of the valve spool, which occurs in exactly the opposite manner to that described above with respect to the rightward shifting thereof, the return force exerted on the valve spool is a combination of the force developed by the mechanical spring 69 and the pressure force of the fluid spring formed by the confinement of the pressurized working fluid within chamber 66.

One of the advantageous features of this valve assembly is that, by positioning the central O-ring 53 within an axially elongated annular groove 52, and by utilizing the incoming pressure fluid for causing axial shifting of the O-ring relative to the valve spool, the axial displacement of the valve spool can be reduced inasmuch as this displacement is less than the total displacement of the O-ring 53 when it shifts between its sealed positions disposed on opposite axial sides of the annular gap 27. By thus minimizing the required magnitude of spool valve movement, this thus permits the valve assembly to be actuated by a wider range of operators, which operators can themselves be operationally and/or structurally simplified. For example, while the illustrated embodiment discloses operation by means of a pilot fluid, it will be appreciated that the valve spool could also be shifted by means of a manually push or pull button, by means of an electrical solenoid, or by other mechanical means. By permitting minimization in the stroke or required shifting movement of the valve spool, the operator can be substantially simplified, particularly in those instances where the operator comprises an electrical solenoid or a fluid-actuated pilot piston.

While FIGS. 1 and 2 disclose a pilot actuation of the valve assembly, and as such utilize a slidable actuator piston 45 disposed between the valve spool 15 and the liner segment 37, it will be recognized that other types of operators will permit elimination of the actuator piston 45, in which case the end of valve spool 15 would be disposed in sealed slidable engagement directly with the end liner segment.

While the above description relates to the use of the compartment 66 as an air spring and cushion, it will be appreciated that the basic structure of this invention involving the use of the shiftable O-ring passing over the radial port which is formed in the valve member and communicates with a closed compartment or chamber at one end thereof, would also be applicable in situations where this structure functions as a pressure-type pilot for causing shifting of the valve spool in at least one direction.

In the valve assembly of this invention, the central O-ring 53 is preferably of a rather large diameter, and particularly is of larger diameter than the O-rings 56 and 57, so as to permit the O-ring 53 to be effectively axially shifted within the groove 52 without being subjected to undesirable failure, while at the same time preventing the O-ring from being extruded out of its groove due to the fluid pressure applied thereto.

Although a particular preferred embodiment of the invention has been disclosed in detail for illustrative purposes, it will be recognized that variations or modifications of the disclosed apparatus, including the rearrangement of parts, lie within the scope of the present invention.

The embodiment of the invention in which an exclusive property or priviledge is claimed are defined as follows:

1. In a valve assembly including housing means having elongated bore means formed therein, a plurality of ports formed in said housing means and communicating with said bore means, said plurality of ports including inlet, outlet, and load ports, and valve means movably positioned within said bore means and disposed in sealed slidable engagement with said housing means for controlling the flow of a compressible pressure fluid between said ports, said valve means being axially movable between a first operational position wherein said inlet and load ports are in communication with one another and a second operational position wherein said load and exhaust ports are in communication with one another, the improvement comprising:

seal means mounted on said valve means and disposed in sealing engagement with said housing means in the vicinity of said inlet port, said seal means being axially shiftable across said inlet port in response to shifting movement of said valve means between said first and second operational positions;

said seal means including an annular groove encircling said valve means and an elastomeric seal ring mounted on said valve means in encircling relationship within said groove, said seal ring being disposed in sealing engagement with said housing means, said annular groove having an axial width substantially greater than the axial width of said seal ring so that the seal ring can be shifted axially along said groove relative to said valve means, said annular groove being in substantially continuous communication with said inlet port, and said seal ring being shifted axially relative to said groove by the pressure fluid supplied through the inlet port when the valve means is shifted between said first and second operational positions; and fluid spring means coacting between said valve means and said housing means for normally urging said valve means toward said first operational position, said fluid spring means including a spring chamber defined between one end of said valve means and the adjacent portion of said housing means, said spring chamber being defined within a closed end of said bore means, and passage means extending interiorly of said valve means for providing substantially continuous communication between said chamber and said inlet port, said passage means terminating in a hole which opens through the bottom of said groove substantially midway between the opposite axial ends thereof, said seal ring being disposed at one axial end of said groove when said valve means is in said first operational position, said seal ring being disposed adjacent the other axial end of said groove when said valve means is in said second operational position, whereby said hole is closed by said seal ring only momentarily during the axial displacement of said seal ring during the shifting thereof between the opposite ends of said groove in response to shifting of said valve means between said first and second operational positions so that pressure fluid supplied through the inlet port continuously communicates with said spring chamber.

2. A valve assembly according to claim 1, including sealing means coacting between said housing means and said valve means adjacent said one end thereof for closing said spring chamber except for its communication with said passage means, and said passage means including a first bore opening inwardly from said one end of said valve means and extending axially inwardly of said valve means over a substantial distance, and a second bore formed within said valve means and extending radially between the bottom of said annular groove and the axially inner end of said first bore.

3. A valve assembly according to claim 1, wherein said fluid spring means includes means associated therewith for cushioning the movement of said valve means into said second operational position, said cushioning means including a restriction associated with said passage means for restricting the flow of pressure fluid from said spring chamber toward said annular groove as said valve means is being moved toward said second operational position so as to cause a reduction in the volume of said spring chamber, whereby the pressure level of the fluid within said spring chamber momentarily increases to effectively cushion the shifting of said valve means into said second operational position.

4. In a four-way valve assembly including housing means having an elongated cylindrical opening formed therein, said housing means including a housing member having sleeve-like liner means stationarily mounted therein and defining said opening, said housing means including an inlet port formed therein and communicating with said opening at a location disposed centrally between the ends thereof, first and second exhaust ports communicating with said opening at locations which are spaced axially on opposite sides of said inlet port, a first load port communicating with said opening at a location axially between said inlet port and said first exhaust port, a second load port communicating with said opening at a location axially between said inlet port and said second exhaust port, and elongated spool valve means movably positioned within said opening and disposed in slidable sealed engagement with said housing means for controlling the flow of a compressible pressure fluid between said plurality of ports, said valve means being axially shiftable between first and second operational positions, said valve means when in said first position permitting pressure fluid to flow from said inlet port into said first load port while said second load port communicates with said second exhaust port, said valve means when in said second operational position permitting the pressure fluid to flow from the inlet port to the second load port while permitting communication between the first load port and the first exhaust port, a first elastomeric O-ring coacting between said valve means and said housing means in the vicinity of said inlet port for controlling the flow of pressure fluid from said inlet port to said first and second load ports, said first O-ring being axially shiftable across said inlet port in response to axial shifting of said valve means between said first and second positions, a second elastomeric O-ring coacting between said valve means and said housing means for controlling the flow of fluid between said first load port and said first exhaust port, and a third elastomeric O-ring coacting between said valve means and said housing means for controlling the flow of fluid between said second load port and said second exhaust port, said first, second and third O-rings all being mounted on said valve means for shifting movement therewith, the improvement comprising:

an annular groove formed in and encircling said valve means in the vicinity of and in continuous communication with said inlet port, said first O-ring being confined within said annular groove to create a sealed relationship between said first O-ring and said valve means, said annular groove having an axial width substantially greater than the diameter of said first O-ring so that the latter can be shifted axially relative to said valve means between the opposite axial ends of said annular groove, said first O-ring being shifted axially from one end to the other end of said groove due to the pressure fluid acting thereon as said first O-ring moves across said inlet port, wall means associated with said housing means and said valve means adjacent one end thereof for defining a substantially closed compartment, said compartment being defined adjacent one end of said opening, and passage means extending interiorly and axially of said valve means for providing substantially continuous communication between said compartment and said inlet port, said passage means including a first bore extending axially inwardly from said one end of said valve means and communicating with a second bore which projects radially outwardly of said valve means and communicates with the bottom of said annular groove at a location disposed substantially midway between the axial ends of said annular groove, whereby said second bore is uncovered and in communication with said inlet port when said first O-ring is disposed at either axial end of said annular groove, said second bore being only momentarily closed by said first O-ring as it is axially shifted from one axial end to the other axial end of said annular groove during the shifting of said valve means between said first and second operational positions, said compartment and the pressure fluid therein defining a fluid spring for continuously urging the valve means toward said other end of said housing means and for cushioning the movement of said valve means toward said one end of said housing means.

5. A valve assembly according to claim 4, wherein said first O-ring is of substantially larger diameter than said second and third O-rings.

6. A valve assembly according to claim 4, wherein said first bore, over at least a major portion of its axial extent, is of substantially large diameter so that the interior of said bore is in open communication with and effectively increases the volume of said compartment, and said second bore being of small diameter to define a restriction to control the discharge of pressure fluid from said compartment so as to cushion the movement of said valve means toward said one end of said housing means.

* * * * *